United States Patent [19]
Suzuki et al.

[11] Patent Number: 5,523,870
[45] Date of Patent: Jun. 4, 1996

[54] OPTICAL TRANSMISSION SYSTEM

[75] Inventors: Yasuhiro Suzuki; Kenji Okada, both of Kanagawa, Japan

[73] Assignee: Nippon Telegraph and Telephone Corporation, Tokyo, Japan

[21] Appl. No.: 356,535

[22] Filed: Dec. 15, 1994

[30] Foreign Application Priority Data

Dec. 17, 1993 [JP] Japan ................... 5-318311

[51] Int. Cl.$^6$ ..................... H04J 14/08
[52] U.S. Cl. ............ 359/139; 359/140; 359/158
[58] Field of Search ............... 359/125, 137, 359/139, 140, 157, 167, 173, 158

[56] References Cited

U.S. PATENT DOCUMENTS 5,398,129  3/1995  Reimann ................... 359/137

FOREIGN PATENT DOCUMENTS 59-122164  7/1984  Japan.
59-167171  9/1984  Japan.
 8905077  6/1989  WIPO ................... 359/137

OTHER PUBLICATIONS

"Ti:LiNbO$_3$ Digital Optical Switch Matrices", Okayama et al, Electronics Letters, vol. 29, No. 9, Apr. 29, 1993, pp. 765–766.

"Functional Structure of the Fiber–Optic Passive Double Star System", Kumozaki et al, IEICE Trans.Commun. vol. E75–B, No. 9, Sep. 1992, pp. 1–9.

"Introduction Approach Toward Full Fiber–Optic Access Network", Okada et al, ICC, Jun. 1991, pp. 91–95.

"Fiber–Optic Subscriber Systems for Point–to–Multipoint Transmission Architecture", Okada et al, ECOC '92, Sep.–Oct. 1992, pp. 102–105.

Primary Examiner—Leo Boudreau
Assistant Examiner—Kinfe-Michael Negash
Attorney, Agent, or Firm—Nikaido Marmelstein Murray & Oram

[57] ABSTRACT

In an optical transmission system between an optical subscriber unit (10; OSU) in a central office and a plurality of optical network units (20$_i$; ONU) in customer premises each coupled with said subscriber unit (10) through a single optical transmission line (32$_i$), an optical switch (40) is provided for selectively coupling one of said network units (20$_i$) to said subscriber unit (10) sequentially on time division multiplexing operation, so that no attenuation except small insertion loss by an optical switch occurs in switching. A downstream frame from said subscriber unit (10) to said network units (20$_i$) has a plurality of time slots each of which is to be switched to a predetermined related network unit, and de-multiplexed by said optical switch. Each time slot has no identification for addressing. An upstream frame from network units are multiplexed by said optical switch. Said downstream frame and said upstream frame are multiplexed in a single optical transmission line either through time division multiplexing or through wavelength multiplexing.

16 Claims, 17 Drawing Sheets

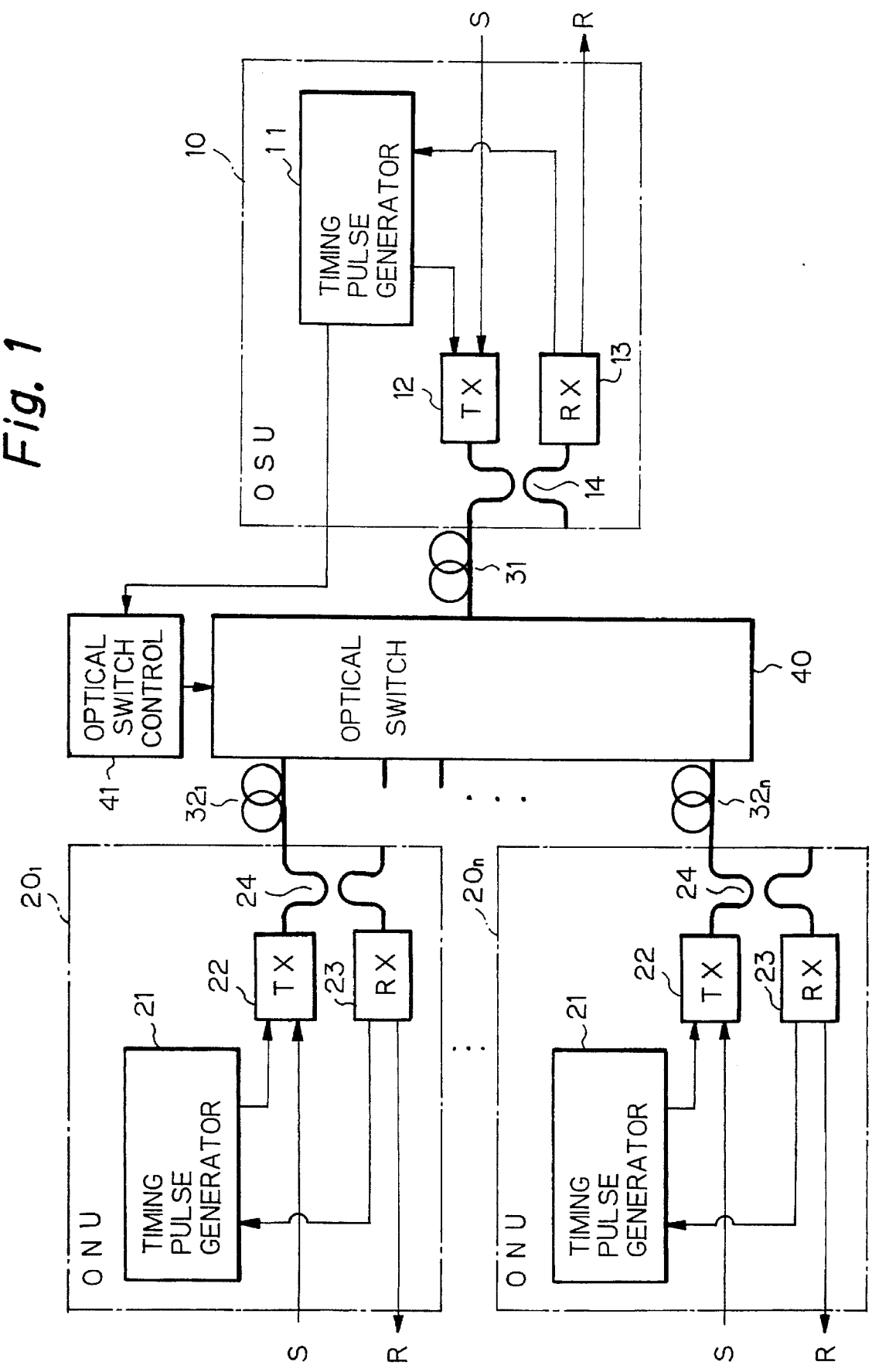

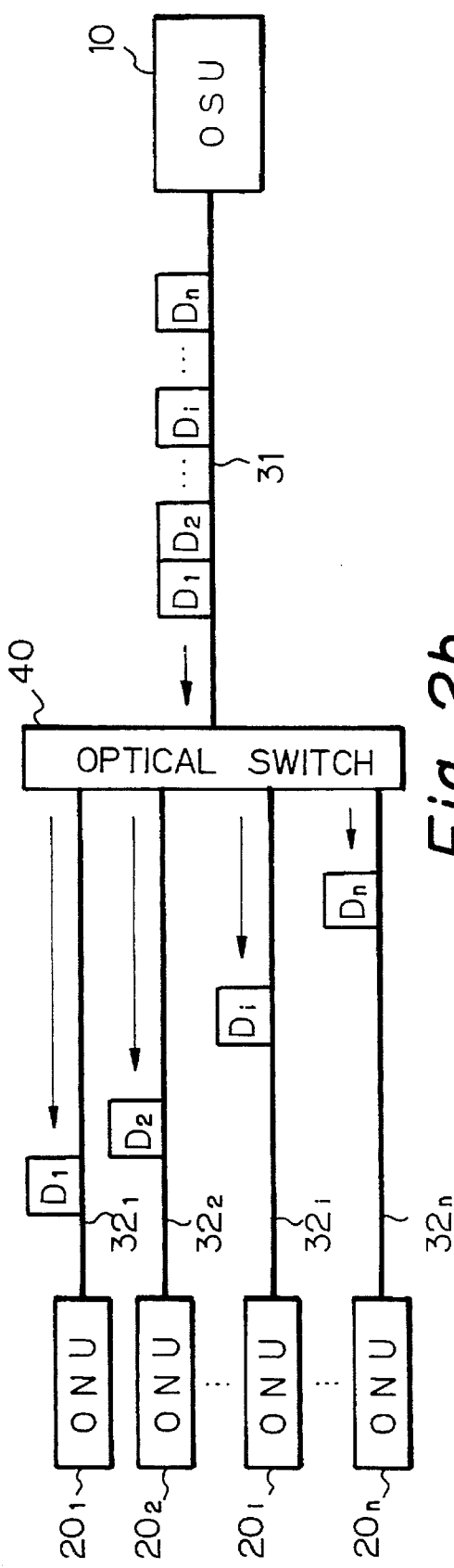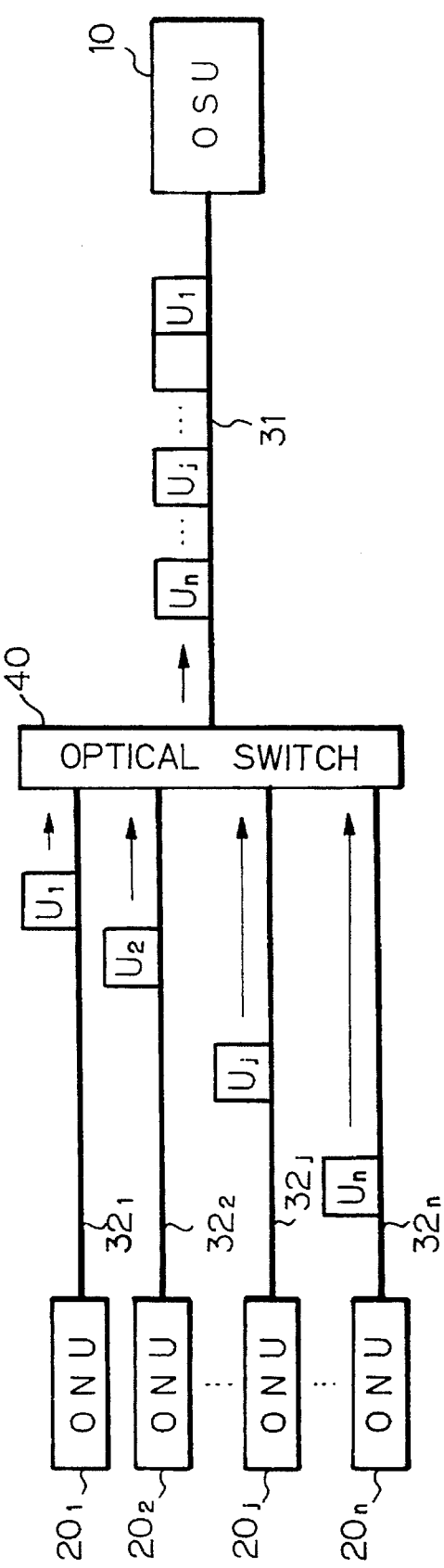

OPTICAL TRANSMISSION SYSTEM

BACKGROUND OF THE INVENTION

The present invention relates to an optical transmission system for communication between two stations through an optical transmission means, in particular, relates to such a system for a communication between an optical subscriber unit in a center office (OSU) and a plurality of optical network stations (ONU) in customer premises coupled with said OSU through an optical means.

An OSU is a center station, and an ONU is a user station.

Conventionally, a passive double star (PDS) system has been known for time division multiplexing (TDM) communication through an optical means between a center station and a plurality of user stations.

FIG. 16 shows such a PDS system, in which an optical star coupler 1 which is a passive element is located at a joint portion, and a center station 2 is coupled with a plurality of user stations $3_1$ through $3_n$ through said coupler 1. In said PDS system, a time compression multiplexing (TCM) is used for time division multiplex of an upward signal ($U_1$, $U_2$, $U_n$) from a user station to a center station, and a downward signal ($D_1$, $D_2$, $D_n$) from a center station to a user station. Simultaneously, a time division multiple access system (TDMA) is used for multiplexing a plurality of upward (downward) signals from (to) a plurality of user stations.

In a TDMA system, the transmission time between a center station and each user station is measured at the beginning of a communication so that transmission timing and communication capacity are assigned to each user station with no overlap of signals of the user stations. Each user station sends an optical signal at assigned timing, the optical signal is multiplexed passively in the optical star coupler 1, and the optical signals of each user stations locate on a time axis at a receive point of the center station 2. Similarly, a downward signal from the center station 2 to each user stations is splitted in the star coupler 1 so that each splitted signal is sent to each user station, which takes only a time slot addressed to the own station in the time division multiplexed signal.

The conventional PDS system has the disadvantage that a downward signal from a center station to user stations is attenuated in a star coupler depending upon the number of user stations, since a star coupler is a passive optical coupler in which a splitted signal is subject to attenuation relating to number of splitted channels. Similar attenuation would occur in an upward signal in a star coupler. Therefore, the requirements become severe for optical devices for transmission power, receive responsivity, et al installed in a center station and a user station, when the number of split in a star coupler is large.

Further, in a conventional PDS system, a frame signal in a downward signal must have an address for identification of each slot in a user station. The presence of an address makes a slot or a frame longer.

Further, since a downward signal is broadcast to all the user stations, a privacy facility or encription is essential. Also, an electronic circuit for processing said address and/or said privacy must be complicated.

SUMMARY OF THE INVENTION

It is an object, therefore, of the present invention to overcome the disadvantages and limitations of a prior optical transmission system by providing a new and improved optical transmission system.

It is also an object of the present invention to provide an optical transmission system which has no attenuation between a center station and a user station so that more user stations may be coupled to the center station.

It is also an object of the present invention to provide an optical transmission system which removes severe requirements for optical devices, shortens a frame, removes requirement for encryption, and simplifies structure of electrical circuits, so that the total cost for optical transmission system is reduced.

The above and other objects are attained by an optical transmission method for optical transmission between an optical subscriber unit in central office having an optical transmit circuit and an optical receive circuit and a plurality of optical network units in customer premises coupled with said subscriber unit through an optical transmission line, an optical switch located in said subscriber unit coupling selectively one of said network units synchronized with time division multiplexing operation with said subscriber unit sequentially, when each of said network units receives a downstream signal from said subscriber unit, said network unit sending upstream signal to said subscriber unit in a predetermined delay time after reception of said downstream signal, and said optical switch coupling said network unit to said subscriber unit so that said upstream signal is received by said subscriber unit synchronized with downstream signal and upstream signal, wherein said downstream signal has only communication data but no identification for addressing a network unit.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 is a block diagram of the first embodiment of the optical transmission system according to the present invention, FIGS. 2a and 2b shows multiplexing and de-multiplexing of optical signals in an optical switch 40.

DESCRIPTION OF THE PREFERRED EMBODIMENTS

Figure 3:
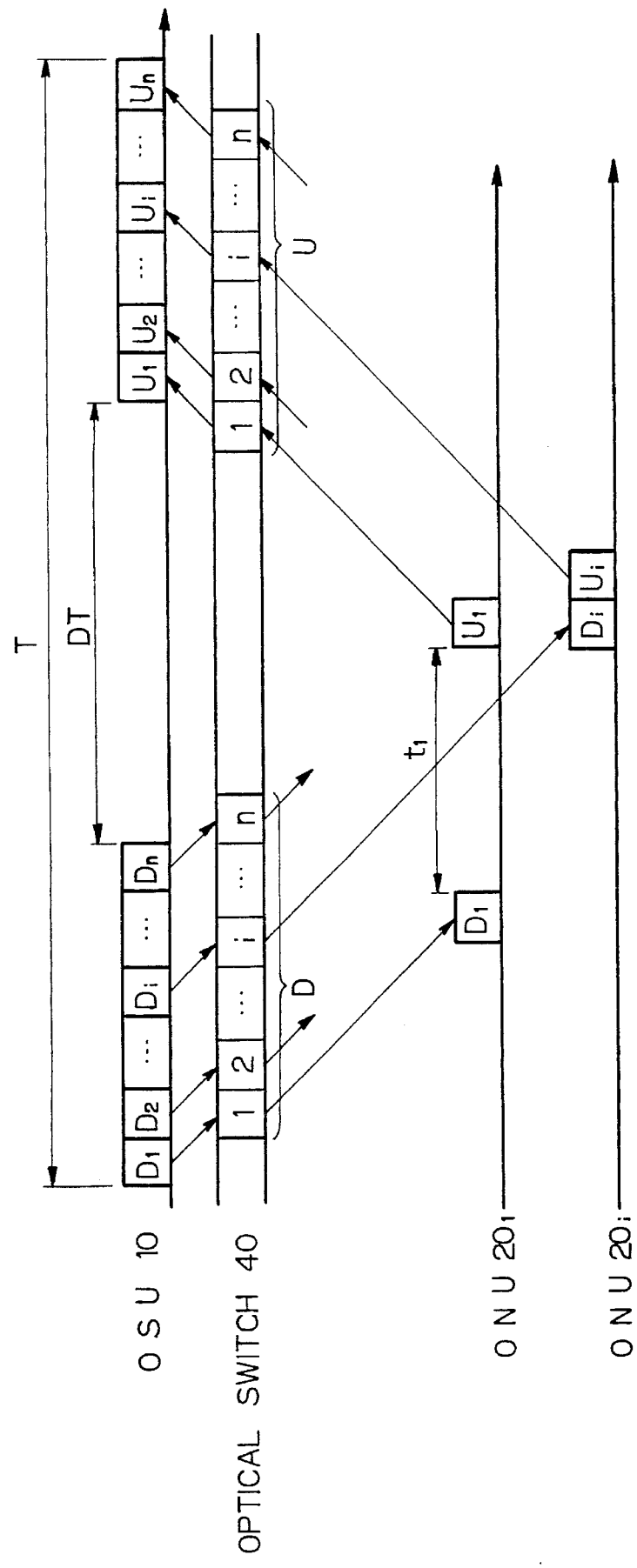
FIG. 3 shows first embodiment of operation of a center station 10, a user station 20, and an optical switch 40.

FIG. 1 shows a block diagram of the optical transmission system according to the present invention. In the figure, the numeral 10 is a center station (an optical subscriber unit; OSU) which is coupled with a single mode optical fiber cable 31, and a plurality of single mode optical fibers $32_1$ through $32_n$ through an optical switch 40. The center station 10 has a timing pulse generator 11, a transmit circuit 12 that operates synchronized with a timing pulse generated by said generator 11, a receive circuit 13, and an optical coupler 14 that couples said transmit circuit 12 and said receive circuit 13 with said single mode optical fiber cable 31.

Similarly, each of the user stations (optical network unit; ONU) 20 has a timing pulse generator 21, a transmit circuit 22, a receive circuit 23, and an optical coupler 24.

A transmit circuit 12 in a center station 10, and a transmit circuit 22 in a user station receive signals S for transmission, and a receive circuit 13 and a receive circuit 23 provides a receive signal R.

An optical switch 40 is controlled by an optical switch control 41, which operates synchronized with a timing pulse supplied by said timing pulse generator 11.

Each user station $20_i$ is coupled with the optical switch 40 through a respective optical fiber cable $32_i$.

The timing pulse generator 21 in a user station 20 is supplied a transmission timing information from the center station 10 through the receive circuit 23, and provides the timing pulse to the transmit circuit 22 based upon said received transmission timing information.

In operation, the optical switch 40 which is controlled by the optical switch control 41 switches a single mode optical fiber cable $32_1$ through $32_n$ one by one so that only one optical fiber cables $32_1$ through $32_n$ is connected to the single mode optical fiber cable 31. The timing pulse generator 11 in the center station 10 sends a timing pulse to said optical switch control 41 and the transmit circuit 11 for the control of the switch 40. The transmit circuit 12 forwards an optical signal $D_i$ addressed to a user station $20_i$ in a downward direction when i'th optical fiber cable $32_i$ is selected and connected to the cable 31 in the optical switch 40. The optical switch 40 connects said downward optical signal $D_i$ to the optical fiber cable $32_i$ which is coupled with the user station $20_i$. Thus, the operation of the transmit circuit 12 in the center station 10 operates synchronized with the operation of the optical switch 40, so that downward optical signals for each user stations are forwarded to the receive circuit 23 of each respective user stations $20_1$ through $20_n$.

It should be appreciated that no attenuation due to split of a signal occurs in the optical switch 40 in the sense of that in a prior optical star coupler, although small insertion loss by an optical switch occurs.

Each of the user stations $20_1$ to $20_n$ has a receive circuit 23, which receives a transmit timing from the center station 10 and sets a timing pulse generator 21 with said transmit timing. Said transmit timing is sent to a transmit circuit 22 so that a transmit circuit 22 in j'th user station $20_j$ forwards an upward optical signal $U_j$ to the center station 10 through the optical fiber cable $32_j$ at said transmit timing. It should be noted that the optical switch 40 couples the optical fiber cable $32_j$ with the optical fiber cable 31 under the control of the optical switch control 41.

Thus, an upward direction optical signal is forwarded from each of user stations $20_1$ through $20_n$ to a receive circuit 13 in a center station 10 under synchronization of a transmit circuit 22 in a user station 20 with an optical switch 40. No attenuation except a small insertion loss occurs because of switching since the switching is carried out by an optical switch, but not an optical star coupler.

FIGS. 2a and 2b show the switching operation in the optical switch 40 as mentioned above. FIG. 2(a) shows the case of downward direction signal, and FIG. 2(b) shows the case of upward direction signal. In FIG. 2(a), a downward direction signal $D_1$ through $D_n$ to the user stations $20_1$ through $20_n$ is sent by the center station 10 in the time divisional multiplexed signal, and the time slot of each signal $D_i$ in the multiplexed signal is determined by the timing pulse generator 11. The optical switch 40 switches or de-multiplexes each time slot signals $D_i$ to the respective user station $20_i$ so that each user station $20_i$ receives on the respective time slot signal $D_i$. Similarly, in FIG. 2(b), an upward direction signal is sent from each user station $20_1$ through $20_n$ to a center station 10 through an optical switch 40 which multiplexes each signal $U_j$ in each respective time slot to a time division multiplexed signal $U_1$ through $U_n$ on an optical fiber cable 31.

It should be noted that each time slot $D_i$ in a downward direction frame has no address information for designating a user station $20_i$, which should receive said slot $D_i$, but has only data for communication.

Figure 4:
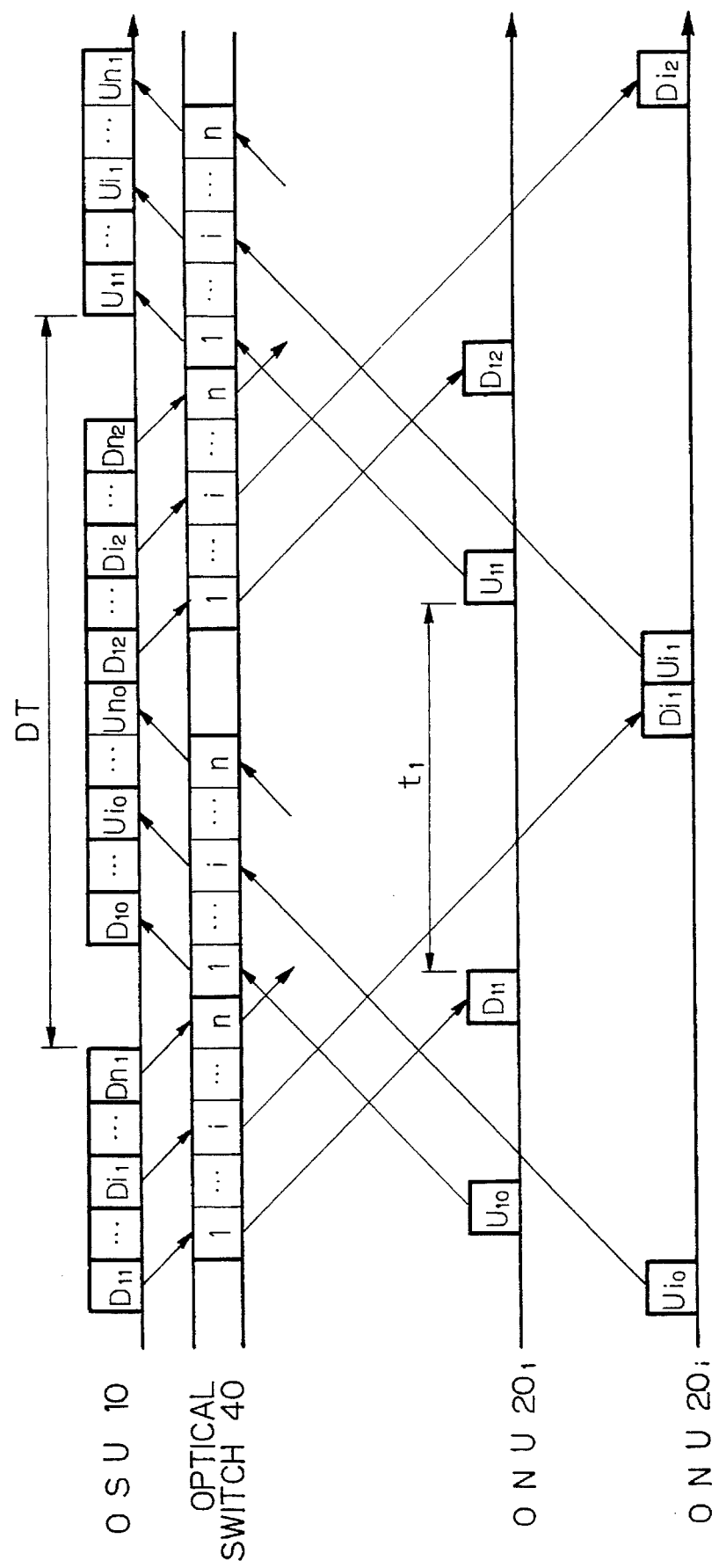
FIG. 4 shows second embodiment of operation of a center station 10, a user station 20, and an optical switch 40.
Figure 5:
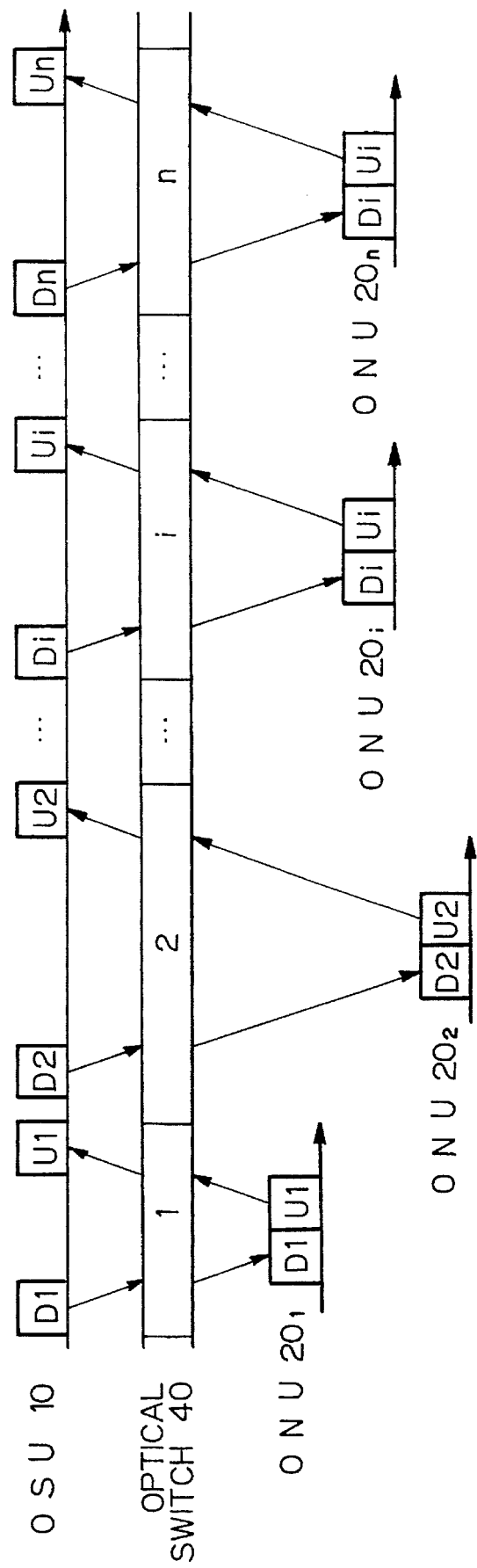
FIG. 5 shows third embodiment of operation of a center station 10, a user station 20, and an optical switch 40.

FIGS. 3 through 5 show some examples of operation of a center station 10, a user station 20, and an optical switch 40 when a duplex communication is carried out between a center station and a user station under time compression multiplexing (TCM) system.

In the embodiment of FIG. 3, a center station 10 forwards a frame of a time division multiplexed signal $D_1$-$D_n$ to each user station $20_1$-$20_n$ in a downward direction and receives a frame of a time division multiplexed signal $U_1$-$U_n$ from each user station $20_1$-$20_n$ in an upward direction with the period T. Some time spacing DT is reserved between the transmit frame and the receive frame. The optical switch 40 couples the optical fiber cable $32_1$-$32_n$ to the cable 31 at the designated time slot (1–n) in the downward direction D, and the upward direction U. The transmission timing $U_1$-$U_n$ in each user station $20_1$-$20_n$ in the upward direction is determined with a predetermined delay time $t_1$-$t_n$ from the end of the downward direction signal considering a reference user station which locates the farthest from the center station 10. In the embodiment of FIG. 3, it is assumed that the user station $20_i$ locates the farthest, and therefore, has the delay time $t_i$=0. The delay time for user stations except a reference user station is determined so that an upward direction signal U is assigned on a time axis in a time division multiplex system.

FIG. 4 shows the modification of FIG. 3. In the operation of FIG. 3, some time spacing DT is inevitable between the end of the downward signal D and beginning of the upward signal U, and the presence of the time spacing DT decreases efficiency of communication in an optical fiber cable. The embodiment of FIG. 4 solves that problem. In FIG. 4, the center station 10 forwards a downward direction signal $D_{11}$-$D_{n1}$, then, receives an upward direction signal $U_{10}$-$U_{n0}$ of a preceeding frame, corresponding to a downward direction signal preceding to $D_{11}$-$D_{n1}$. Then, the center station 10 sends a downward direction signal $D_{12}$-$D_{n2}$ of a succeeding frame, corresponding to a downward direction signal succeeding to $D_{11}$-$D_{n1}$. Then, the center station 10 receives the upward direction signal $U_{11}$-$U_{n1}$ which corresponds to the downward direction signal $D_{11}$-$D_{n1}$. Therefore, it should be noted that in the time spacing DT between the end of the downward direction signal $D_{11}$-$D_{n1}$ and the beginning of the upward direction signal $U_{11}$-$U_{n1}$, the center station receives the upward direction signal of the preceeding frame, and transmits the downward direction signal of the succeeding frame, and therefore, the time spacing DT is not idle, and the communication efficiency is improved as compared with that of FIG. 3. It should be appreciated that a plurality of frames may be received and/or transmitted during the time spacing DT, although FIG. 4 shows the case that only one frame is inserted in said time spacing DT.

FIG. 5 shows another operation. In FIG. 5, an optical switch 40 switches both a downward direction signal $D_i$ and an upward direction signal $U_i$ for each user station at the same time. The width of the time window (1 through n) which the optical switch 40 couples the center station to the respective user station may depend upon the distance between the center station and the user station, alternatively, said time window may be fixed so that it is long enough to cover both a downward signal and an upward signal of the farthest user station.

In the above explanation, the optical coupler 14 in the center station 10 operates to couple the transmit circuit 12 and the receive circuit 13 with the optical fiber cable 31. The optical coupler 24 in each user station operates to couple the transmit circuit 22 and the receive circuit 23 with the respective optical fiber cable $32_i$. The optical coupler 14 and/or 24 may be implemented by a directional coupler or a Y-branch, in which the branch ratio is not restricted only to 1:1, but another branch ratio is possible.

Figure 6:
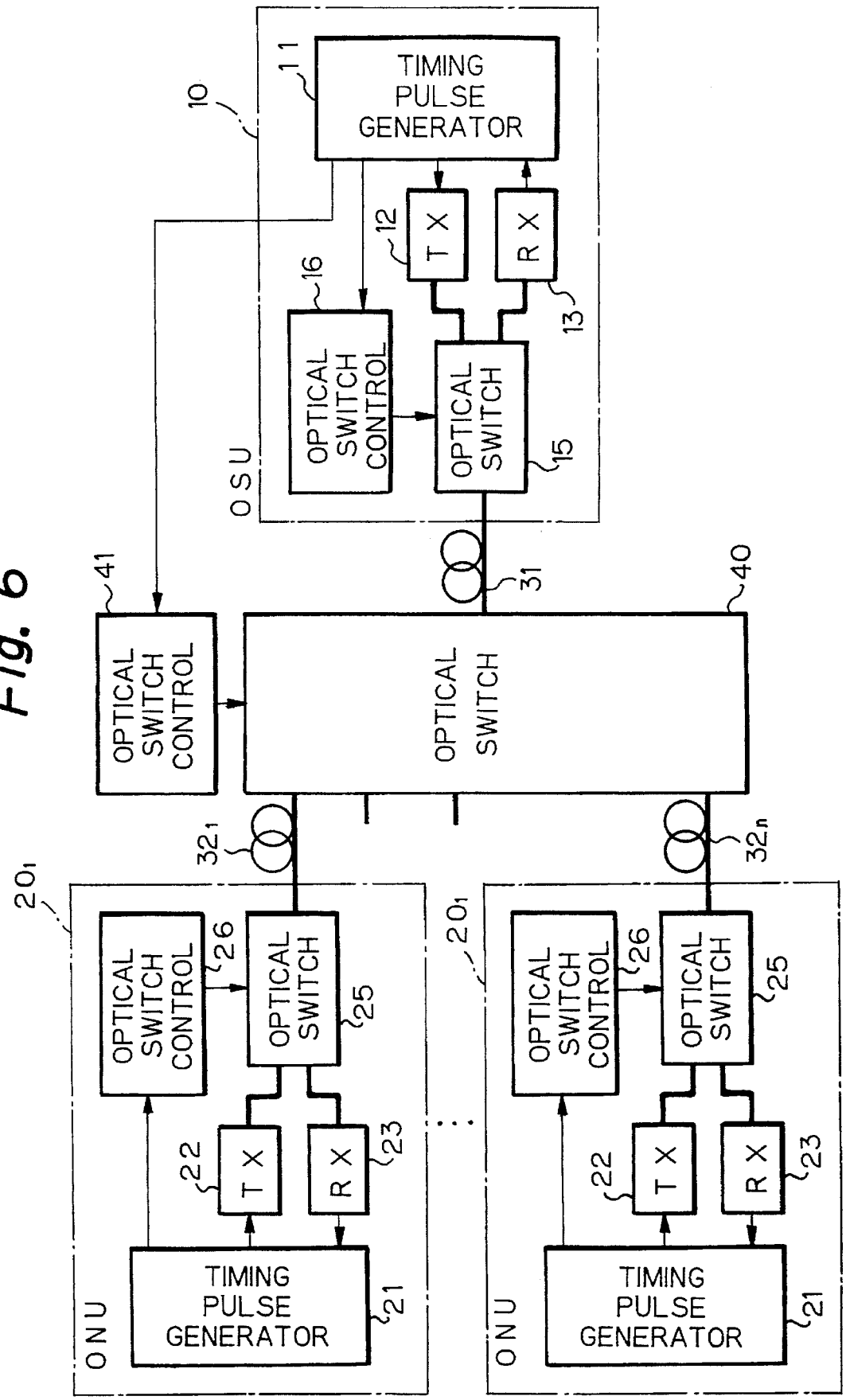
FIG. 6 is a block diagram of a modification of the optical transmission system according to the present invention.

FIG. 6 shows the modification of FIG. 1. The feature of FIG. 6 is the use of an optical switches 15 and 25 instead of the optical couplers 14 and 24. The optical switches 15 (or 25) operates to switch the: transmit circuit 12 (or 22) and the receive circuit 13 (or 23) to the optical fiber cable 31 (or $32_i$) under the control by the optical switch controls 16 (or 26), receives a timing pulse from the timing pulse generator 11 (or 21) for the operation of the optical switch 15 (or 25). The use of the optical switch 15 (or 25) eliminates the attenuation in an optical coupler 14 (or 24) in the embodiment of FIG. 1. The operation explained in accordance with FIGS. 3 through 5 is applicable to the modification of FIG. 6.

Figure 7:
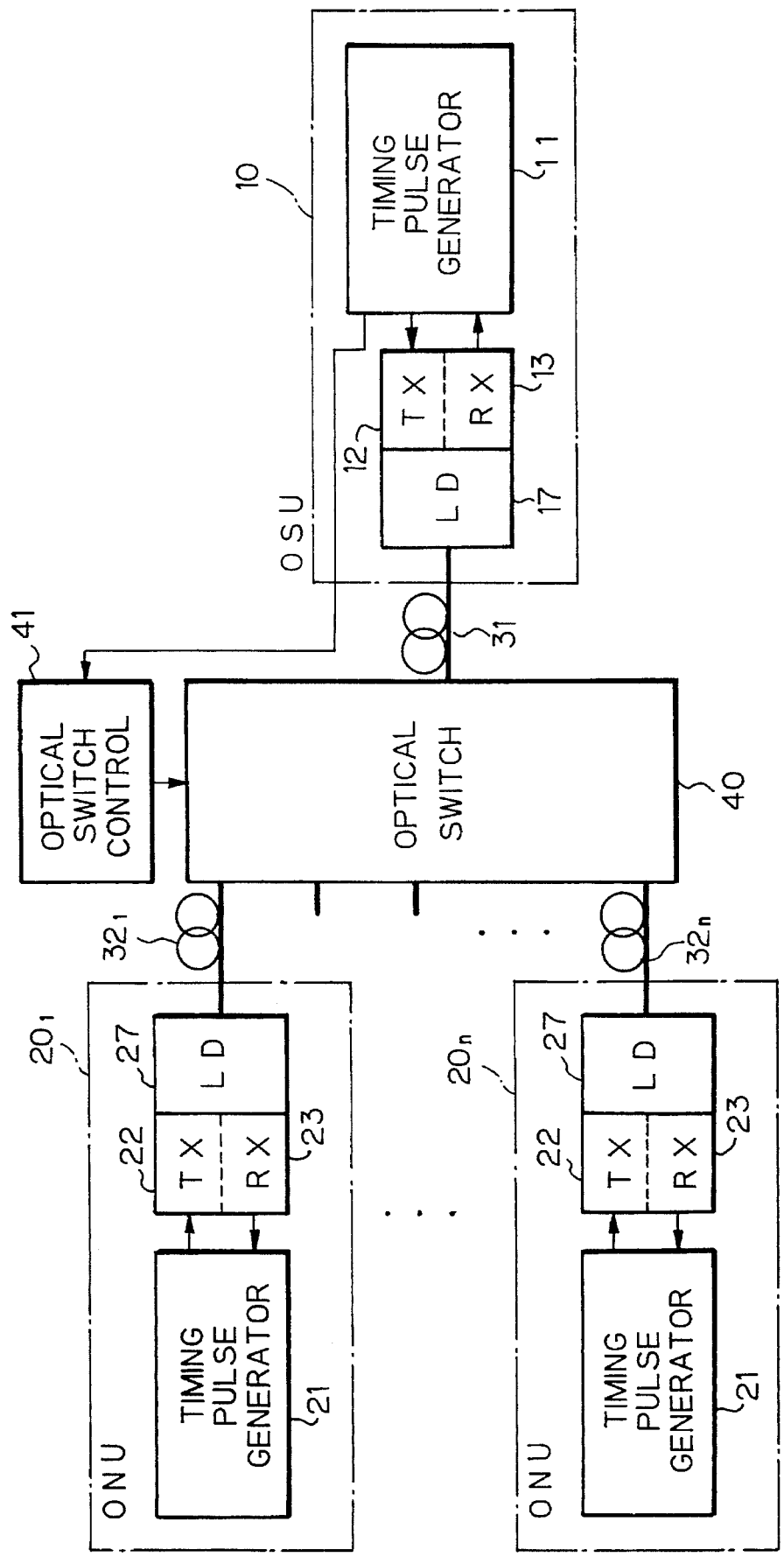
FIG. 7 is a block diagram of another modification of the optical transmission system according to the present invention.

FIG. 7 shows another modification of FIG. 1. The feature of FIG. 7 is the use of a semiconductor laser 17 in a center station 10, and a semiconductor laser 27 in a user station 20. The semiconductor laser 17 (or 27) replaces an electrical-optical converter installed in a transmit circuit 12 (and 22), and an optical-electrical converter installed in a receive circuit 13 (and 23). Those converters are not shown in FIG. 1, but it is a matter of course to those skilled in the art that a transmit circuit 12 (and 22) in FIG. 1 has an electrical-optical converter and a receive circuit 13 (and 23) has an optical-electrical converter.

It should be appreciated that a semiconductor laser generates light when forward current is applied so that it operates as an electrical-optical converter. And, it operates as a waveguide type optical sensor when reverse bias voltage is applied or no bias voltage is applied so that it operates as an optical-electrical converter.

The use of a semiconductor laser 17 (or 27) eliminates the use of an optical coupler 14 (and 24) and/or an optical switch 15 (and 25), and therefore, it is advantageous in reducing attenuation of signal, and producing cost of an apparatus. The operation explained in accordance with FIGS. 3 through 5 are applicable in the modification of FIG. 7.

Figure 8:
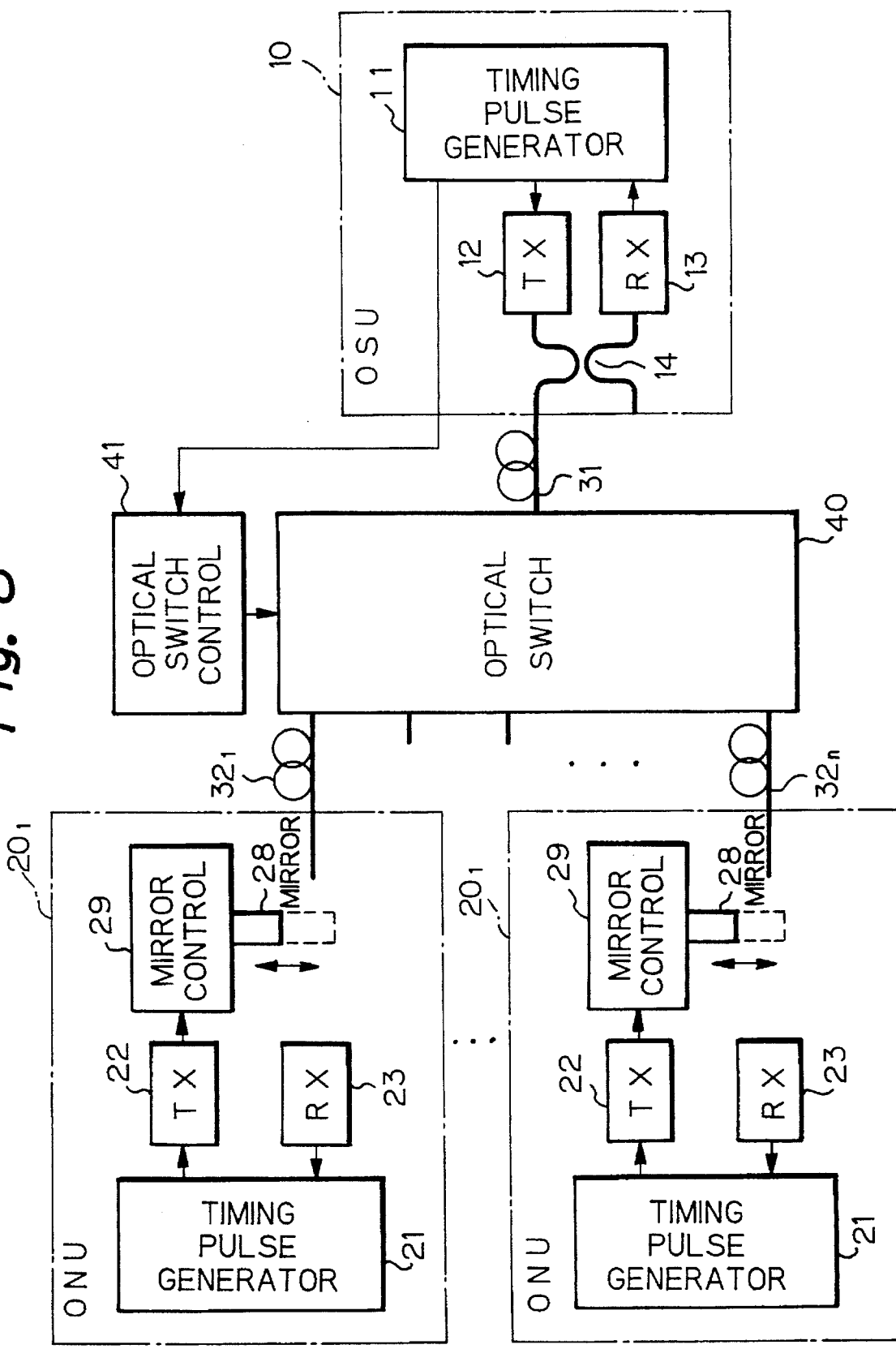
FIG. 8 is a block diagram of still another modification of the optical transmission system according to the present invention.

FIG. 8 shows still another modification of FIG. 1. The modification of FIG. 8 may be used with the combination of the modifications of FIG. 6 and/or FIG. 7. The feature of the modification of FIG. 8 is in the structure of a transmit circuit in a user station $20_1$-$20_n$. A user station $20_i$ (i=1 through n) has a timing pulse generator 21, a transmit circuit 22, a receive circuit 23, a reflection mirror 28, and a mirror control 29 which shifts said reflection mirror 28 in the optical fiber cable $32_i$ or out of the cable $32_i$ according to an output signal of said transmit circuit 22. It is supposed that a center station 10 has the function to transmit a non-modulated continuous signal in this modification. The operation described in accordance with FIGS. 3 through 5 is applicable also in the modification of FIG. 8.

In operation of FIG. 8, the center station 10 sends a downward direction signal to the receive circuits 23 in the user stations $20_1$ through $20_n$ under the synchronized control of the transmit circuit 12 and the optical switch 40. It is supposed that the reflection mirror 28 is out of the optical path during the transmission of the downward direction signal.

The receive circuit 23 in each user stations sets the timing pulse generator 21 according to the transmit timing instructed by the center station 10 for each user station. The transmit circuit 22 is activated during said transmit timing supplied by the timing pulse generator 21, and sends the transmit signal directed to the center station 10 to the mirror control 29.

The mirror control 29 shifts or vibrates the mirror 28 by vibrating a piezoelectric element according to the transmit signal of the user station so that the mirror 28 is in the optical path or out of the optical path whether the transmit element is 1 or 0. At the same time, the center station transmits a non-modulated continuous optical signal during the receive slot for the user staion. Said non-modulated optical signal is reflected by the mirror in the user station and returns light to the center station if the mirror is in the optical path, or does not return light to the center station if the mirror is out of the optical path, and therefore, the center station can receive the transmit signal from the user station.

The modification of FIG. 8 has the advantageous in reducing manufacturing cost of a user station, since no optical coupler, or no optical switch is necessary in a user station, and no electrical-optical converter which consumes much power in a transmit circuit 22 in a user station.

In further modification of FIG. 8, a combination of a reflection mirror 28 and a mirror control 29, and an optical-electrical converter in a receive circuit 23 may be replaced by the combination of an optical modulator and an optical-electrical converter having a half mirror, or a semiconductor amplifier of a Fabry-Perot (FP) type.

When a Fabry-Perot type semiconductor amplifier is used in a user station, it operates in the receive phase as an optical-electrical converter in reverse bias or no bias condition. In transmit phase, a center station sends non-modulated signal, which is applied to the Fabry-Perot semiconductor amplifier biased in forward direction. The Fabry-Perot amplifier modulates the non-modulated optical signal from the center station according to the transmit signal of the user station, and returns the modulated (and/or amplified) signal to the center station.

In the above embodiments and modifications described above, the transmit timing in each user station is determined by a center station which measures transmit time which depends upon distance of the center station and each user station, and informs the user station the measured result.

Figure 9:
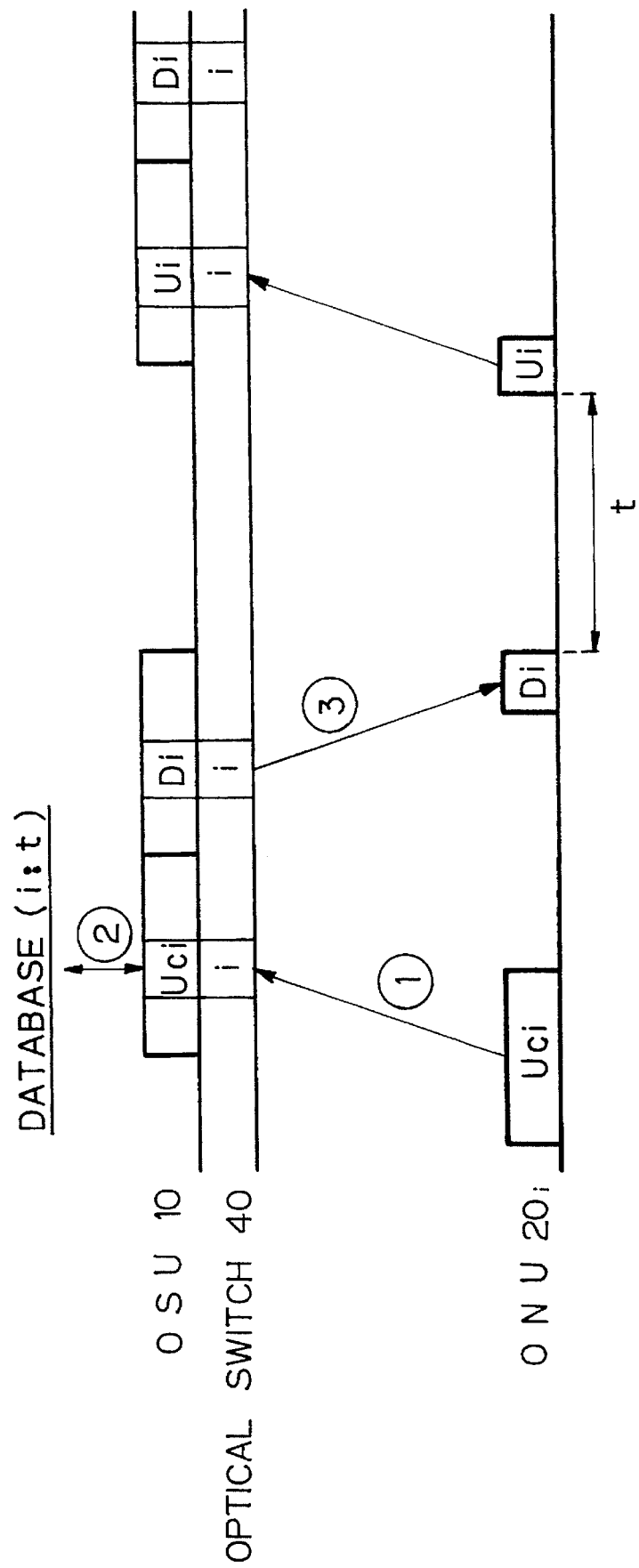
FIG. 9 shows an assignment of transmission time in a user station $20_i$.
Figure 10:
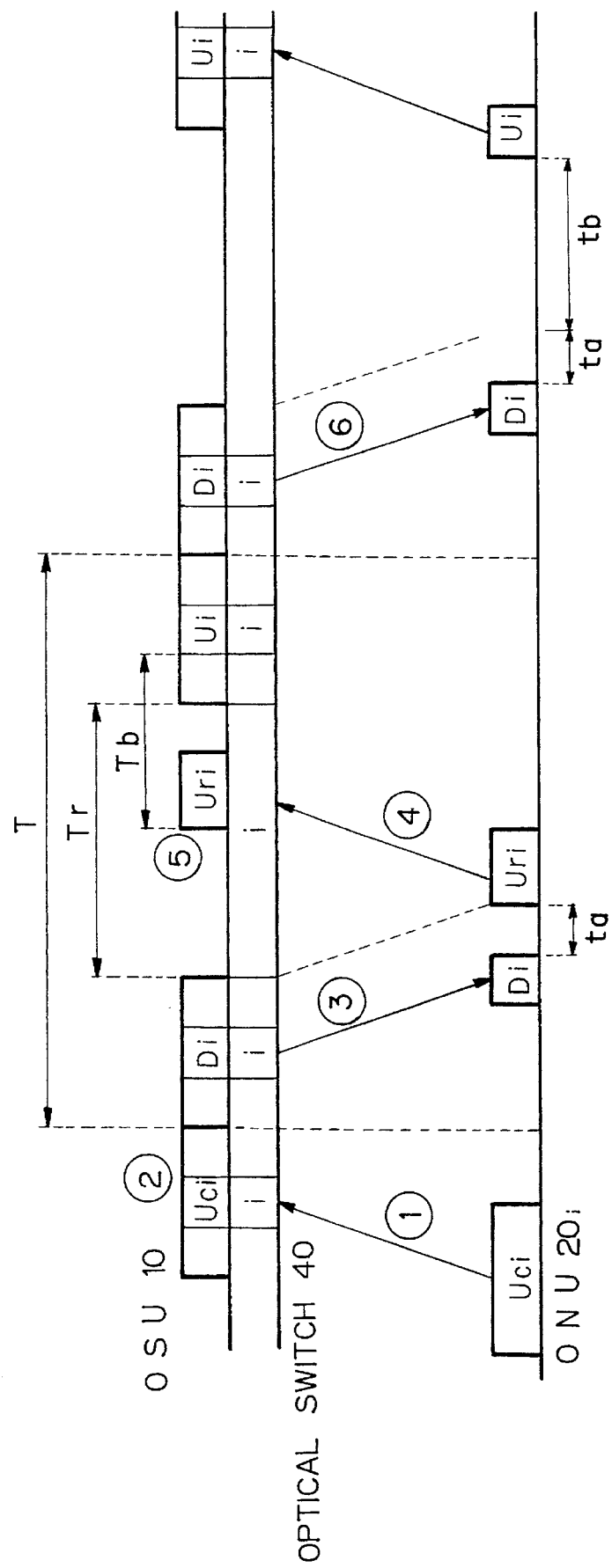
FIG. 10 shows another assignment of transmission time in a user station $20_i$.
Figure 11:
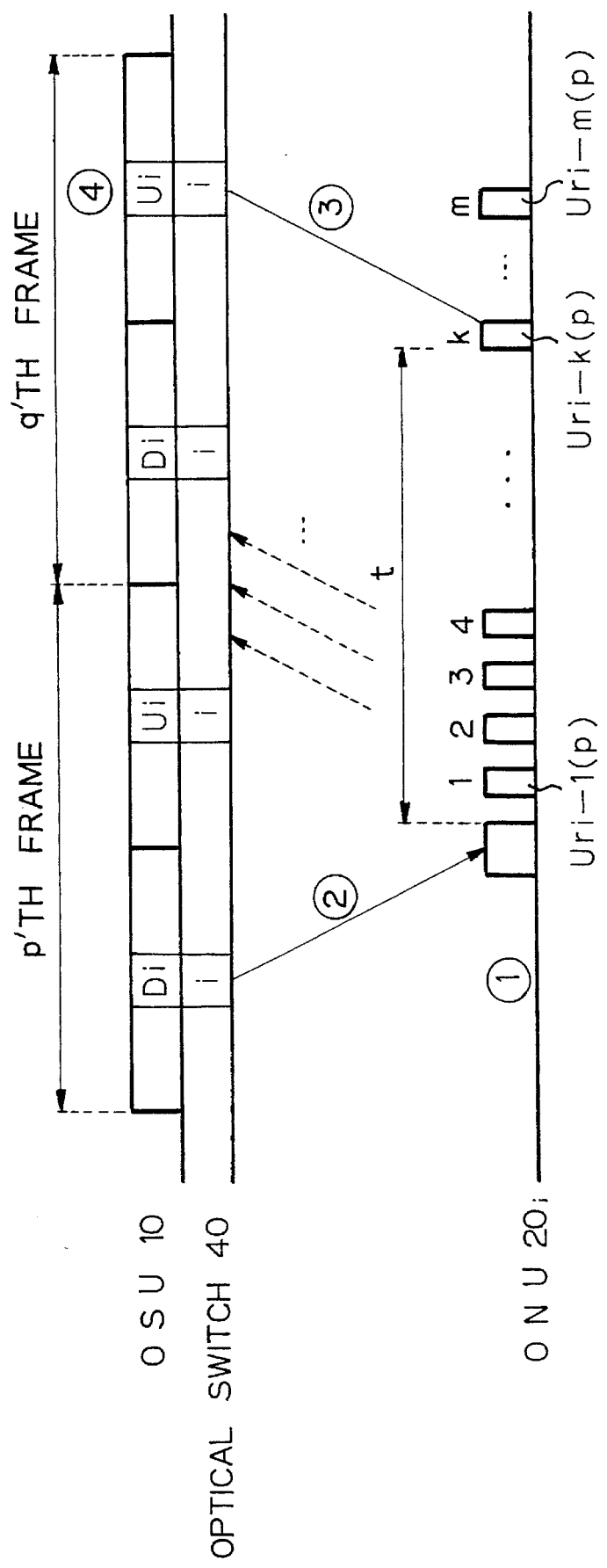
FIG. 11 shows still another assignment of transmission time in a user station $20_i$.

FIGS. 9 through 11 show some embodiments for determining the transmit time in each user station. It is assumed in those embodiments that no time delay exists between a center station 10 and an optical switch 40.

FIG. 9 shows the embodiment that a center station 10 has a database which stores a delay time which each user station takes, and the center station informs a user station the transmit timing of the user station based upon said database, in the following procedure.

(1) A user station $20_i$ sends a center station a continuous request signal $U_{ci}$. The pulse width of the continuous signal $U_{ci}$ is determined according to the distance between the farthest user station and a center station.

(2) An optical switch 40 scans the user stations sequentially. When the optical switch 40 is positioned (i), and couples the optical fiber cable $32_i$ with the optical fiber cable 31, the center station 10 receives the continuous request signal $U_{ci}$ of the user station $20_i$. Then, the center station consults the database and reads the delay time (t) for the user station which is sending the continuous request signal $U_{ci}$.

(3) Then, the center station informs the delay time (t) read out of the database to the user station $20_i$, when the center station sends a downward signal $D_i$. When the user station $20_i$ sends an upward direction signal $U_i$ to the center station with the assigned delay time (t) after the receive of the downward signal $D_i$, the optical switch 40 is in the position (i) synchronized with the transmission by the user station $20_i$, and the center station 10 receives the upward direction signal $U_i$ from the user station $20_i$.

FIGS. 10 and 11 show other embodiments for determining transmit timing in a user station, in which transmit time between a center station and a user station is measured in each communication, and the center station informs the user station the transmit timing or the delay time based upon the measured transmit time. In one modification, the transmit time may be measured at a predetermined time (for instance at the beginning of communication every day), instead of the beginning of each communication.

The embodiment of FIG. 10 is used for the operation mentioned in accordance with FIG. 3, and the followings are the procedure for determining the transmit timing in a user station.

(1) A user station sends a continuous request signal $U_{ci}$ to a center station. The pulse width of the continuous request signal is determined according to the distance of the farthest user station from the center station.

(2) When the optical switch 40 selects (i) or the optical fiber cable $32_i$, so that the user station $20_i$ is coupled with the center station, the center station 10 receives said continuous request signal $U_{ci}$ from the user station $20_i$.

(3) The center station 10 sends the user station $20_i$ the first measured signal $D_i$, which urge the user station $20_i$ to return the second measured signal for measuring the transmit time, and fixes the optical switch 40 to the position (i) just after said signal $D_i$ is sent. The duration $T_r$ which the optical switch 40 is fixed to the position (i) is determined based upon the farthest user station, and is common to all the user stations. T is the period as mentioned in accordance with FIG. 3.

(4) Responding to said signal $D_i$, the user station $20_i$ sends the measure signal $U_{ri}$ for measuring the transmit time to the center station, after a predetermined delay time $t_a$ which is common to all the user stations. The delay time $t_a$ is necessary to prevent collision of the signal $U_{ri}$ with other downward direction signals.

(5) The center station measures the transmit time between the center station and the user station $20_i$ upon receipt of the signal $U_{ri}$ from the user station $20_i$ and calculates the respective delay time $t_b$.

(6) The center station 10 informs the user station $20_i$ the transmit timing which is $t_a+t_b$, and when the user station sends an upward direction signal $U_i$, the optical switch 40 is positioned to the position (i) to select said signal $U_i$, so that the signal $U_i$ is received by the center station 10.

In a modification of FIG. 10, a request signal $U_{ci}$ from a user station may be omitted, and instead, a center station forwards a first measure signal $D_i$ to all the user stations. A user station which wishes to send a data to the center station responds to said first measure signal $D_i$ and returns a second measure signal $U_{ri}$. Thus, the steps (1) and (2) in the above procedure are omitted, and the steps (3) through (6) are carried out.

FIG. 11 shows another embodiment for determining a transmit time in a user station, and corresponds to the modification of FIG. 4, and operates as follows.

(1) A user station $20_i$ is ready for receiving.

(2) When an optical switch selects a position (i), a center station 10 sends a first measure signal $D_i$ to the user station $20_i$ to urge the user station to send a second measure signal for measuring transmit time. Said first measure signal is always sent to each user station at timing (i) when no communication is carried out between a center station and a user station, and said first measure signal is received by the user station in receive mode.

(3) Upon receipt of said first measure signal at the user station, the user station $20_i$ sends a plurality of second measure signals $U_{ri-1(p)}$, $U_{ri-2(p)}$, $U_{ri-3(p)}$...$U_{ri-k(p)}$ at a predetermined interval to the center station for measuring transmit time, Each of those signals includes a number k(p) of a signal (first signal, second signal, third signal, et al).

(4) Assuming that the center station receives the k'th signal $U_{ri-k(p)}$ when the optical switch 40 selects the position (i), the delay time is the difference of $U_{ri-1(p)}$ and $U_{ri-k(p)}$.

Next, the center station instructs the user station the transmit timing, as is the operation (6) in a downward signal $D_i$ in the embodiment of FIG. 10 and when the user station forwards an upward direction signal $U_i$ at the instructed timing, the optical switch 40 is positioned at (i) so that said signal $U_i$ is sent to the center station.

In a modification of FIG. 11, a first measure signal $D_i$ from the center station may responde to a request signal from a user station.

In case of the modification of FIG. 5, a switching of an optical switch 40 must be controlled, instead of the control of transmit time in a user station. For instance, when a center station 10 sends a downward direction signal $D_i$ to a user station $20_i$ an optical switch 40 is fixed to position (i). The user station $20_i$ forwards an upward direction signal $U_i$ after it receives a downward direction signal $D_i$. The center station 10 releases the optical switch 40 from the position (i) upon receipt of the upward direction signal $U_i$.

Figure 12:
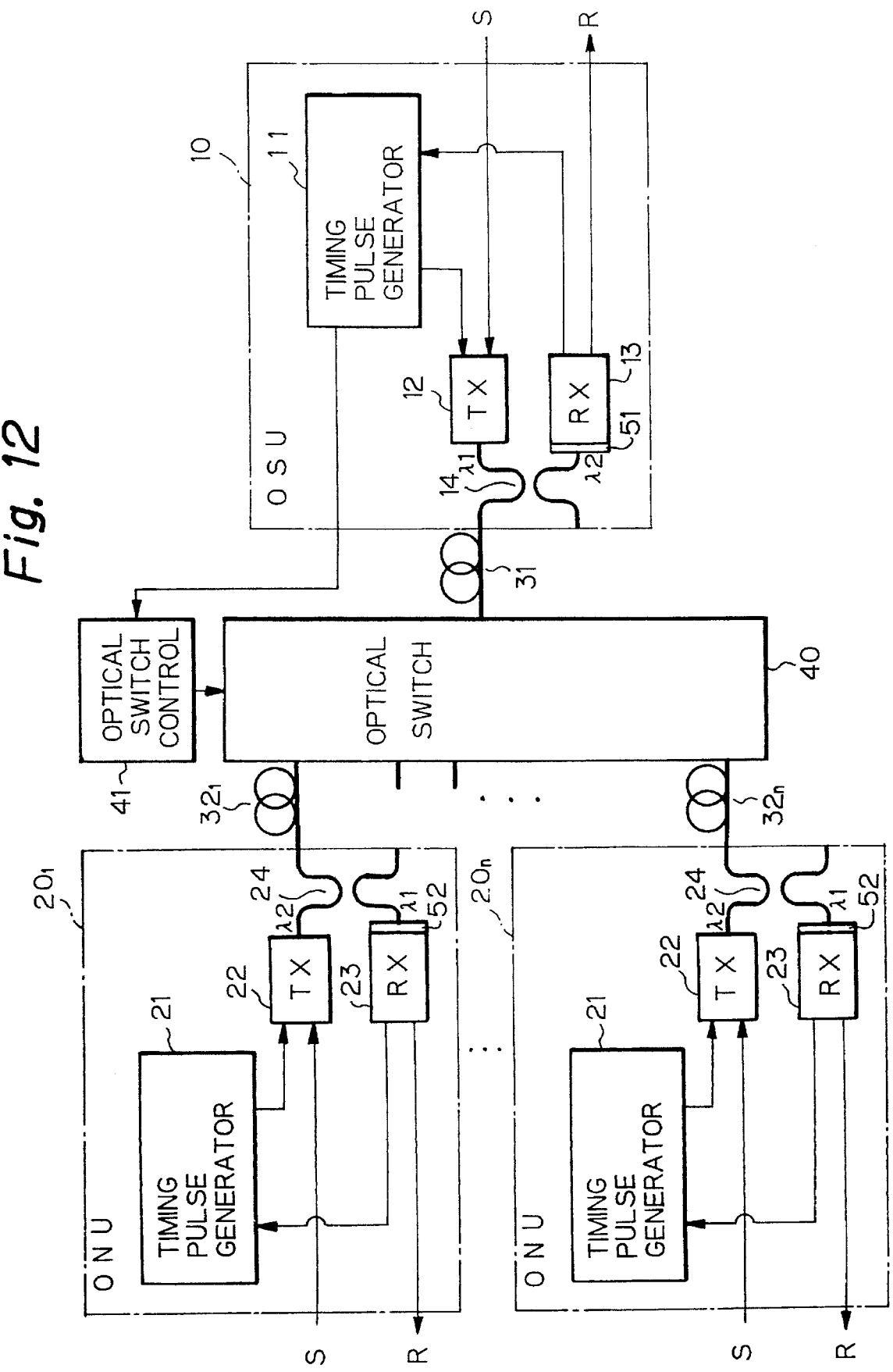
FIG. 12 is a block diagram of another embodiment of the optical transmission system according to the present invention.

FIG. 12 shows a block diagram of another embodiment according to the present invention. The embodiment of FIG. 12 is the modification of the embodiment of FIG. 1, and the same reference numerals as those in FIG. 1 show the same members. The idea of FIG. 12 may be applied to the embodiments of FIGS. 6 through 8.

The feature of FIG. 12 resides in that the wavelength ($\lambda_1$) in the downward direction differs from the wavelength ($\lambda_2$) in the upward direction, and those wavelengths are multiplexed so that wavelength division multiplexing (WDM) duplex communication is provided between a center station and each of the user stations through a single optical fiber cable. The receive circuit 13 in the center station 10 has a wavelength filter 51 at an input portion of the receive circuit 13 so that only the wavelength ($\lambda_2$) is transferred to the receive circuit 13. Similarly, a wavelength filter 52 which passes the wavelength ($\lambda_1$) is provided at an input portion of a receive circuit 23 of a user station.

Figure 13:
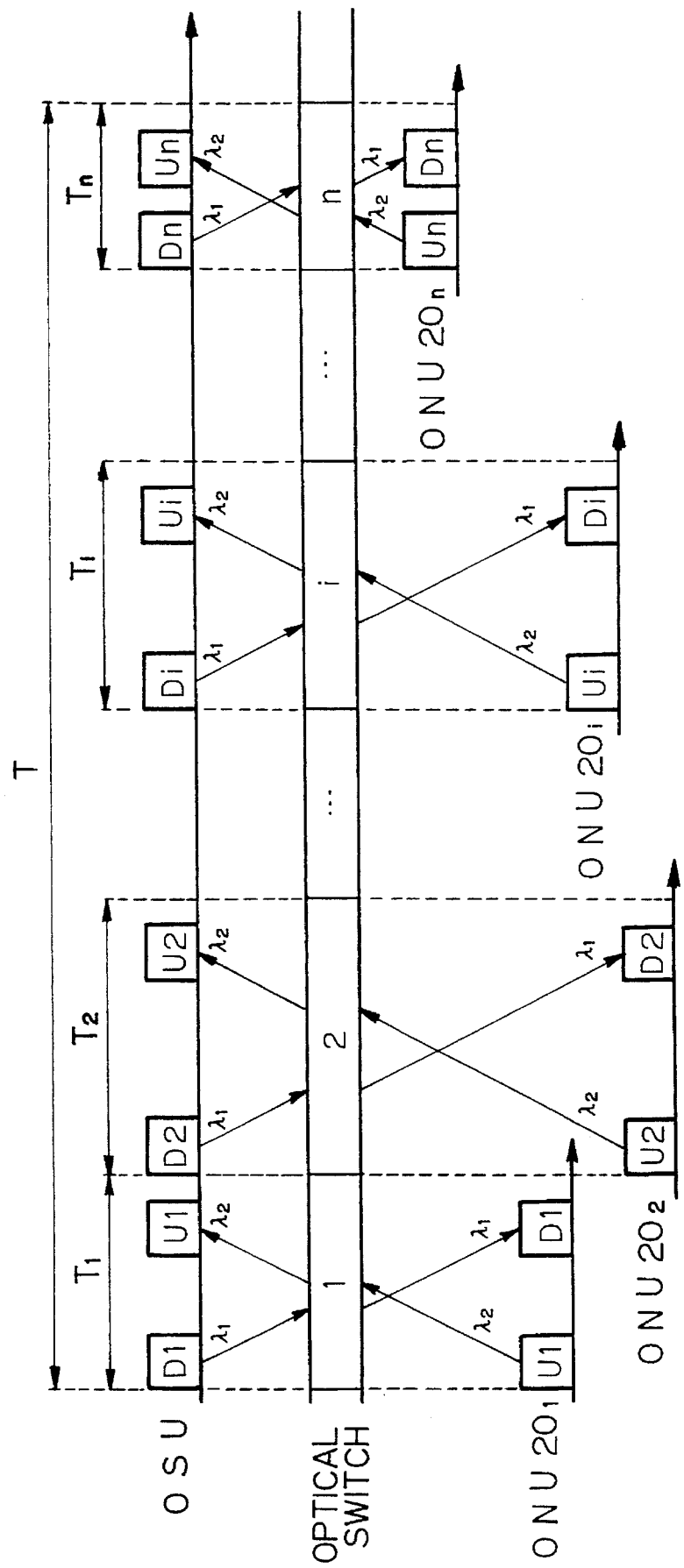
FIG. 13 shows an operation of a center station 10, a user station 20 and an optical switch 40 in the embodiment of FIG. 12.

FIG. 13 shows the operation of FIG. 12. The operation of FIG. 13 is similar to that of FIG. 5, and a center station handles both a downward direction signal $D_i$ and an upward direction signal $U_i$ to each user station $20_i$ in one time slot $T_i$, then, switches to the next user station $20_{i+1}$. The feature of FIG. 13 as compared with that of FIG. 5 is that downward wavelength and upward wavelength are transmitted simultaneously in both directions.

The duration $T_1$ through $T_n$ which an optical switch 40 couples a particular station with a center station may be determined depending upon the distance between each user station and the center station, alternatively, it may be fixed to a predetermined value which corresponds to the farthest user station from the center station. In the former case, as is shown in FIG. 13, the center station fixes the optical switch 40 to the position (i) just when the center station 10 forwards a downward direction signal $D_i$ to the user station $20_i$, and releases the optical switch 40 from the position (i) upon receipt of an upward direction signal $U_i$.

The wavelength division multiplexing system described in accordance with FIGS. 12 and 13 has the advantage that communication is carried out quickly as both downward direction signal and upward direction signal are transmitted at the same time.

Figure 14:
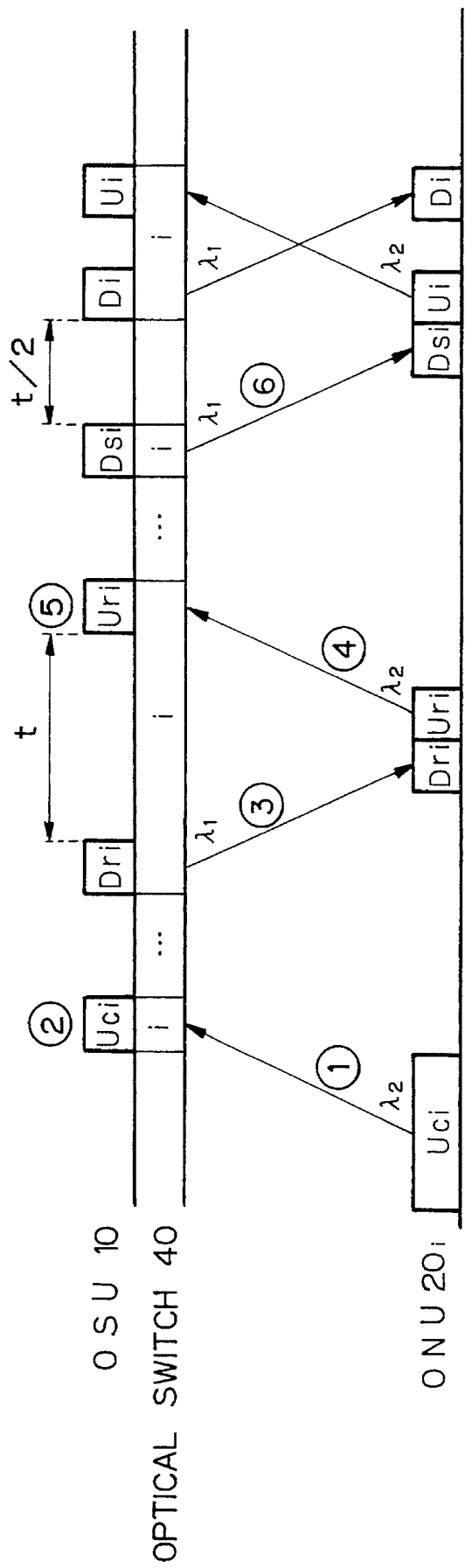
FIG. 14 shows a transmission timing of a user station $20_i$, and a switching timing of an optical switch 40.

The transmit timing in each user station in the embodiment of FIGS. 12 and 13 is determined so that a center station measures propagation time between a center station and each user station, and informs the user station the measured propagation time or delay time. This is explained in accordance with FIG. 14.

(1) A user station $20_i$ forwards a continuous request signal $U_{ci}$ with wavelength ($\lambda_2$). The pulse width of the signal $U_{ci}$ is determined according to the distance of the farthest user station from a center station.

(2) When an optical switch 40 selects i or optical fiber cable $32_i$, a center station 10 receives said request signal $U_{ci}$ of the user station $20_i$. The optical switch 40 selects the position i periodically.

(3) The center station 10 forwards the user station $20_i$ a first measure signal of wavelength ($\lambda_1$) urging the user station to return a second measure signal for transmit time, and fixes the optical switch 40 to the position (i).

(4) The user station $20_i$ returns the center station 10 the second measure signal $U_{ri}$ immediately with wavelength ($\lambda_2$).

(5) The center station 10 releases the optical switch 40 from the position (i) and measures the delay time (t), upon receipt of the second measure signal $U_{ri}$.

(6) The center station 10 forwards the user station $20_i$ the transmit timing signal $D_{si}$ with wavelength ($\lambda_1$), and after t/2 of said signal $D_{si}$, the center station 10 sends the user station $20_i$ a downward direction communication signal $D_i$ which is addressed to the user station $20_i$.

The user station $20_i$ sends the center station 10 an upward direction communication signal $U_i$ of wavelength ($\lambda_2$) upon receipt of the transmit timing signal $D_{si}$.

The transmission and/or reception of signals between the center station 10 and the user station $20_i$ is repeated with period T.

Figure 15:
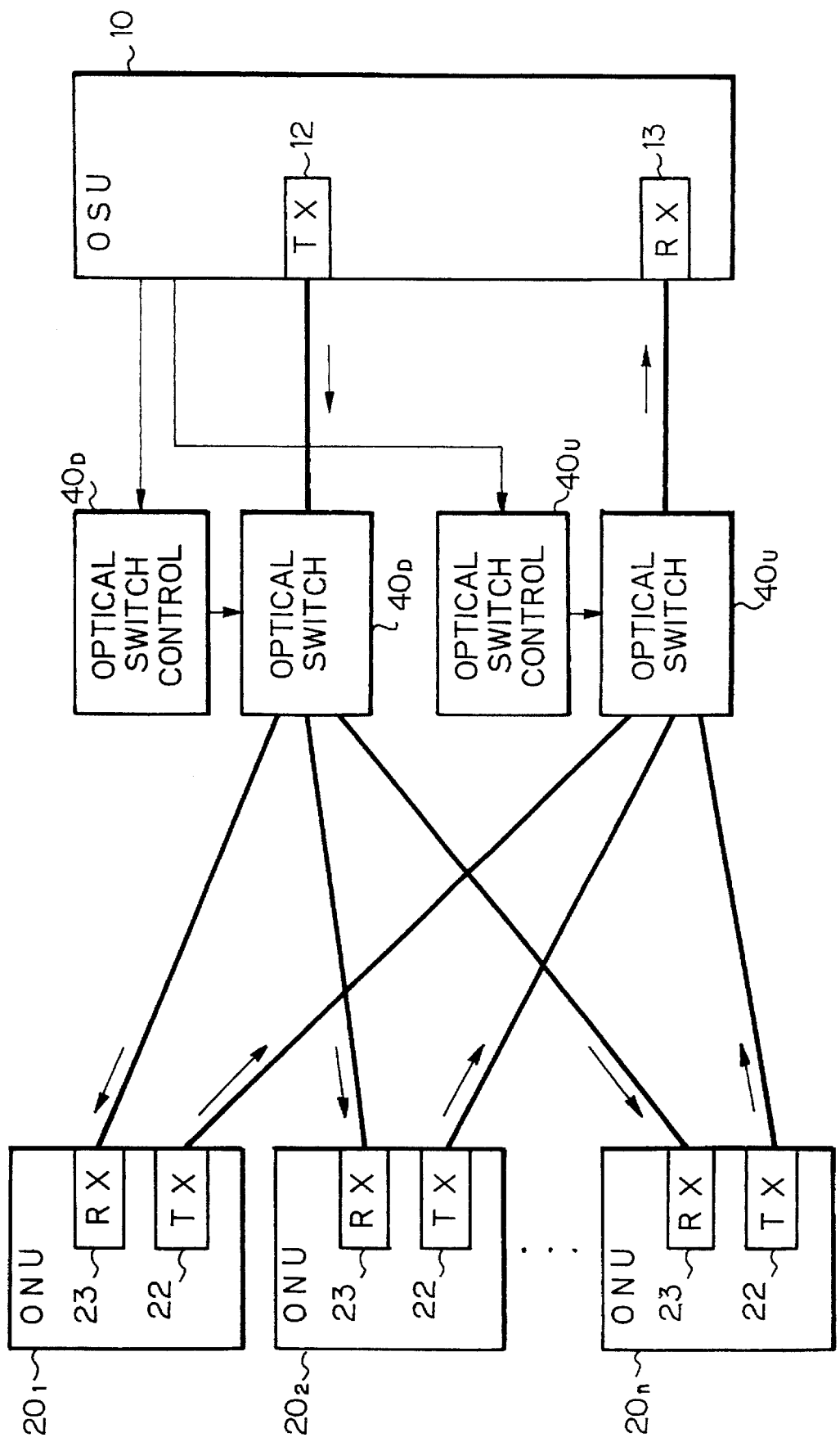
FIG. 15 is a block diagram of still another embodiment of the optical transmission system according to the present invention.
Figure 16:
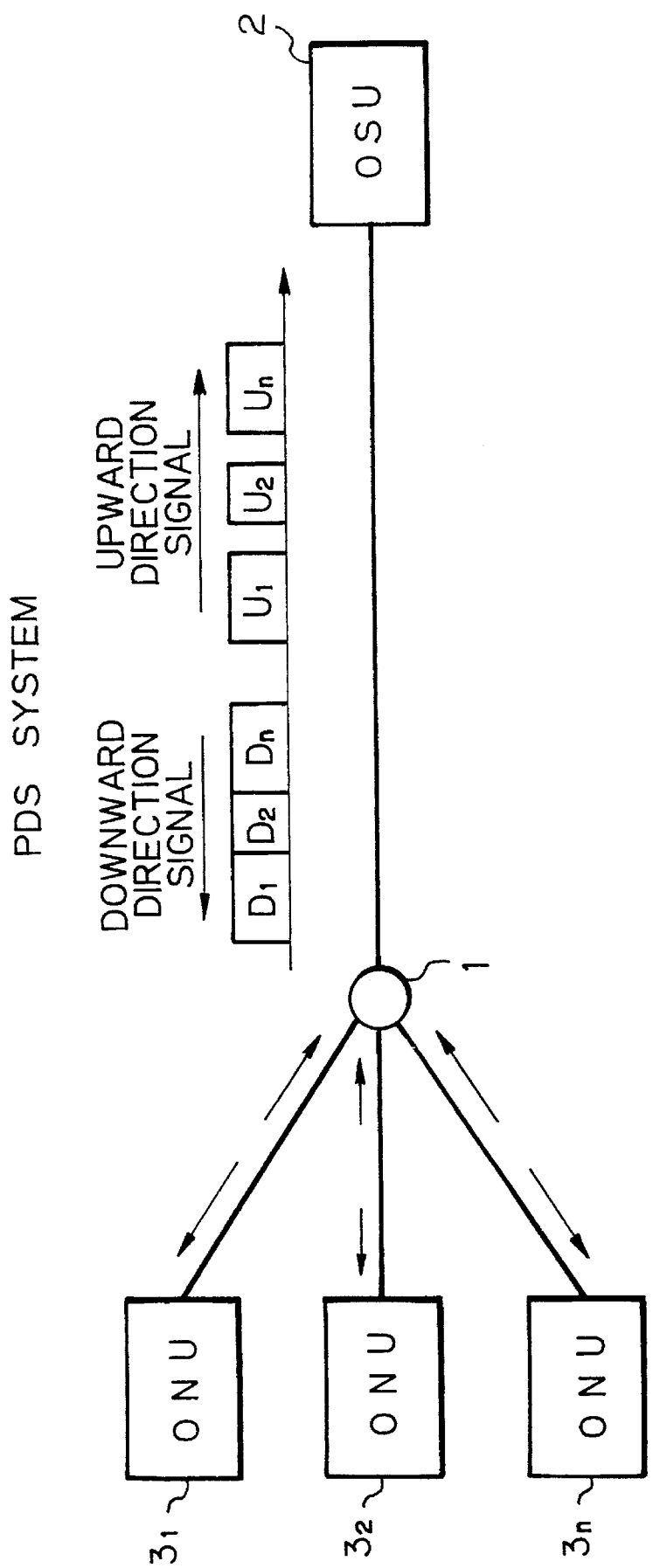
FIG. 16 is a block diagram of a prior optical transmission system.

FIG. 15 is a block diagram of still another embodiment of the present invention. The feature of FIG. 15 resides in that an upward direction cable and a downward direction cable are provided separately for each user station, each cables are provided with an optical switch $40_D$, and another optical switch $40_U$. The embodiment of FIG. 15 has the advantage that both direction communications are possible at the same time, by not multiplexing signals, through control of optical switch controls $41_D$ and $41_U$ and transmit timing control for the user stations $20_1$ through $20_n$. The control of those optical switch control, and the transmit timing control are similar to those in the previously mentioned embodiments and modifications.

Figure 17:
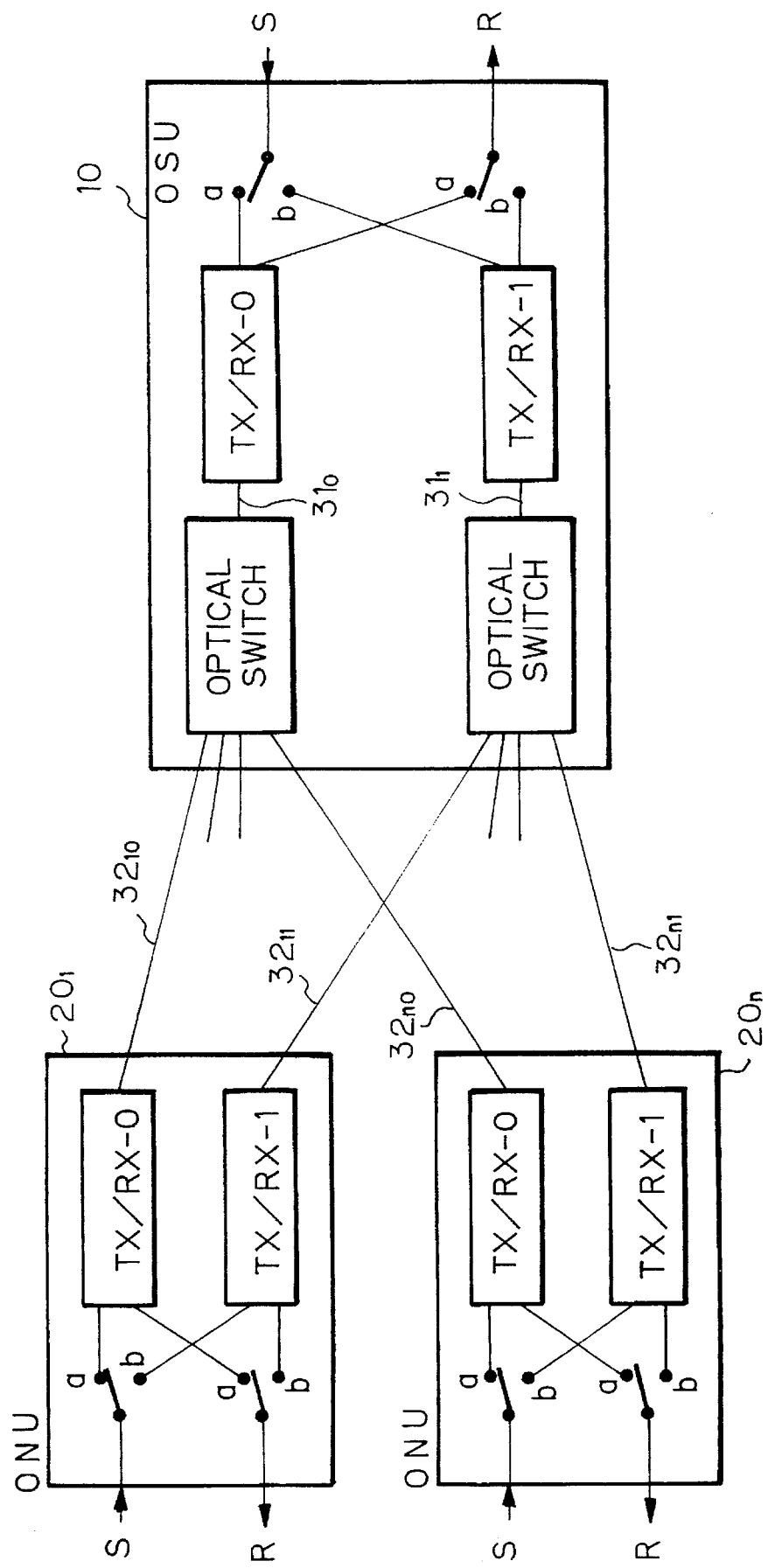
FIG. 17 is a block diagram of still another embodiment of the optical transmission system according to the present invention.

FIG. 17 shows a modification of the present invention, and the idea of FIG. 17 is applicable to all the embodiments and the modifications mentioned previously. The feature of FIG. 17 is that a center station and each user station have a pair of apparatuses for increasing operational reliability. That is to say, a center station has a first transmit circuit/receive circuit TX/RX-0, and a second transmit circuit/receive circuit TX/RX-1, a first optical switch, and a second optical switch, which are coupled through respective optical lines $31_0$ and $31_1$ with the transmit/receive circuits, respectively. Similarly, each user station has a first transmit/receive circuit TX/RX-0 and a second transmit/receive circuit TX/RX-1, each coupled with optical switches through respective optical cables $32_{10}$ and $32_{11}$, respectively. The center station has a switch $SW_c$ and the user station has a switch $SW_u$ for selecting one of the communication systems for operation. When the system 0 is selected, the switches $SW_c$ and $SW_u$ are connected to the contact (a), and the transmit signal S in the center station is supplied to the first transmit/receive circuit, and the receive signal R is provided by the first transmit/receive circuit. Similar operation is carried out in a user station. When the system 1 is selected, the switches $SW_c$ and $SW_u$ are connected to the contact (b). The system which is not selected is standby. Thus, the switching of the systems is effected to the whole optical transmission system.

As mentioned above in detail, the present optical transmission system has an optical switch between a center station and a plurality of user stations for switching optical fiber cables, so that multiplexing and/or de-multiplexing of optical signals is carried out by said optical switch. Because of no use of an optical coupler which is used in a prior art and is subject to attenuation of optical energy, for multiplexing and/or de-multiplexing, the present invention has the advantage that multiplexing and/or de-multiplexing is carried out with no attenuation. Therefore, the number of user stations coupled with a center station may be increased as compared with that of a prior art, because of no attenuation, and further, the requirement for an optical element used in a center station and a user station is not severe.

Further, since each user station is coupled with a center station through a respective cable, privacy of communication is kept.

Further, a downward direction signal does not have an identification for addressing a user station, and therefore, length of each signal frame is shortened, and communication efficiency is improved. And electronic circuit is simplified, and thus, the total producing cost of a system is reduced.

From the foregoing, it will now be apparent that a new and improved optical transmission system has been found. It should be understood of course that the embodiments disclosed are merely illustrative and not intended to limit the scope of the invention. Reference should be made to the appended claims, therefore, rather than the specification as indicating the scope of the invention.

What is claimed is:

1. A method for optical transmission between an optical subscriber unit in a central office having an optical transmit circuit and an optical receive circuit and a plurality of optical network units in customers premises coupled with said subscriber unit through an optical transmission line, comprising the steps of:

selectively sequentially coupling one of said network unit synchronized with a time division multiplexing operation to an optical switch located in said subscriber unit;

sending a downstream signal, that has only communication data and no identification for addressing a network unit, from said subscriber units to said network units;

sending an upstream signal from said network unit to said subscriber unit in a predetermined delay time after reception of said downstream signal; and coupling through the use of said optical switch said network unit to said subscriber unit so that said upstream signal is received by said subscriber unit synchronized with said downstream and said upstream signals.

2. A method for optical transmission as claimed in claim 1 further comprising:

forwarding a frame of time division multiplexed downstream signals from said subscriber unit during an operation period (T) in a first phase;

next pausing said subscriber unit during a second phase; and then receiving a frame of time multiplexed upstream signals by said subscriber during a third phase.

3. A method for optical transmission as claimed in claim 2 further comprising:

receiving a preceding fame ($U_{10}$) of time division multiplexed upstream signal and forwarding a succeeding frame ($D_{12}$) of time division multiplexed downstream signal during said second phase.

4. A method for optical transmission as claimed in claim 1 wherein said predetermined delay time is such that a delay time from a farthest network from said subscriber unit is zero.

5. A method for optical transmission as claimed in claim 1 further comprising:

determining said predetermined delay time for each network unit; and storing said determined predetermined delay time in said subscriber unit.

6. A method for optical transmission as claimed in claim 1 further comprising:

determining said predetermined delay time for each network unit by measuring a propagation time between said network unit and said subscriber unit for each communication.

7. A method for optical transmission as claimed in claim 6 further comprising:

forwarding a request signal ($U_{ci}$) to a network unit for measuring propagation time; and measuring propagation time between said network and said subscriber unit in a measure period prior to an operation period.

8. A method for optical transmission as claimed in claim 6 further comprising:

forwarding a plurality of measure signals from said network unit to said subscriber unit for measuring propagation time; and determining propagation time with a measure signal that is received by said subscriber unit in a time window opened to a respective network unit.

9. A method for optical transmission as claimed in claim 6 wherein a wavelength for an upstream frame differs from a wavelength for a downstream frame, and an upstream frame and a downstream frame are wavelength multiplexed.

10. A method for optical transmission as claimed in claim 9 further comprising:

determining said predetermined transmit time for determining a transmit timing in a network unit comprising, sending a request signal ($U_{ci}$) from a network unit to a subscriber unit, fixing said optical switch to said network unit by said subscriber unit upon receipt of said request signal and forwarding of a first measure signal (Dri) to said network unit, returning a second measured signal ($U_{ri}$) by said network unit to said subscriber unit after said network unit receives said first measure signal, determining a delay time (t) between transmission of said first measure signal ($D_{ri}$) and reception of said second measure signal ($U_{ri}$) by said subscriber unit.

11. A method for optical transmission as claimed in claim 6 wherein a wavelength for an upstream frame is equivalent to a wavelength for a downstream frame, and an upstream frame and a downstream frame are wavelength multiplexed.

12. An optical transmission system comprising:

an optical subscriber unit comprising an optical transit circuit and an optical receive circuit;

a plurality of optical network units coupled with said subscriber unit through an optical transmission line, each optical network unit comprising an optical transmit circuit and an optical receive circuit;

an optical switch located in said subscriber unit for selectively coupling one of said network unit synchronized with a time division multiplexing operation;

a timing control means for controlling said transmit circuit and receive circuit in said subscriber unit in a time division multiplexing operation, for controlling said optical switch synchronized with said time division multiplexing operation, and for informing each of said network units when said network units transmits an upstream signal to said subscriber unit.

13. An optical transmission system according to claim 12, wherein said transmit circuit and said receive circuit in said subscriber unit and said network unit, respectively, are coupled with said optical transmission line through an optical coupler.

14. An optical transmission system according to claim 12, wherein said transmit circuit and said receive circuit in said subscribe unit and said network unit, respectively are coupled with said optical transmission line through an optical switch.

15. An optical transmission system according to claim 12, wherein said transmit circuit and said receive circuit in said subscribe unit and said network unit, respectively, are coupled with an optical transmission line through a laser diode.

16. An optical transmission system according to claim 12, wherein a transmit circuit in said network unit has a mirror which is actuated according to a transmit signal in said network unit, and said subscriber unit sending a non-modulated optical signal to said network unit and receiving reflection light by said mirror to detect said signal from said network unit.

* * * * *